Nov. 3, 1936.  D. F. WARNER  2,059,830
VARIABLE SPEED DUAL DRIVE
Filed Sept. 5, 1935
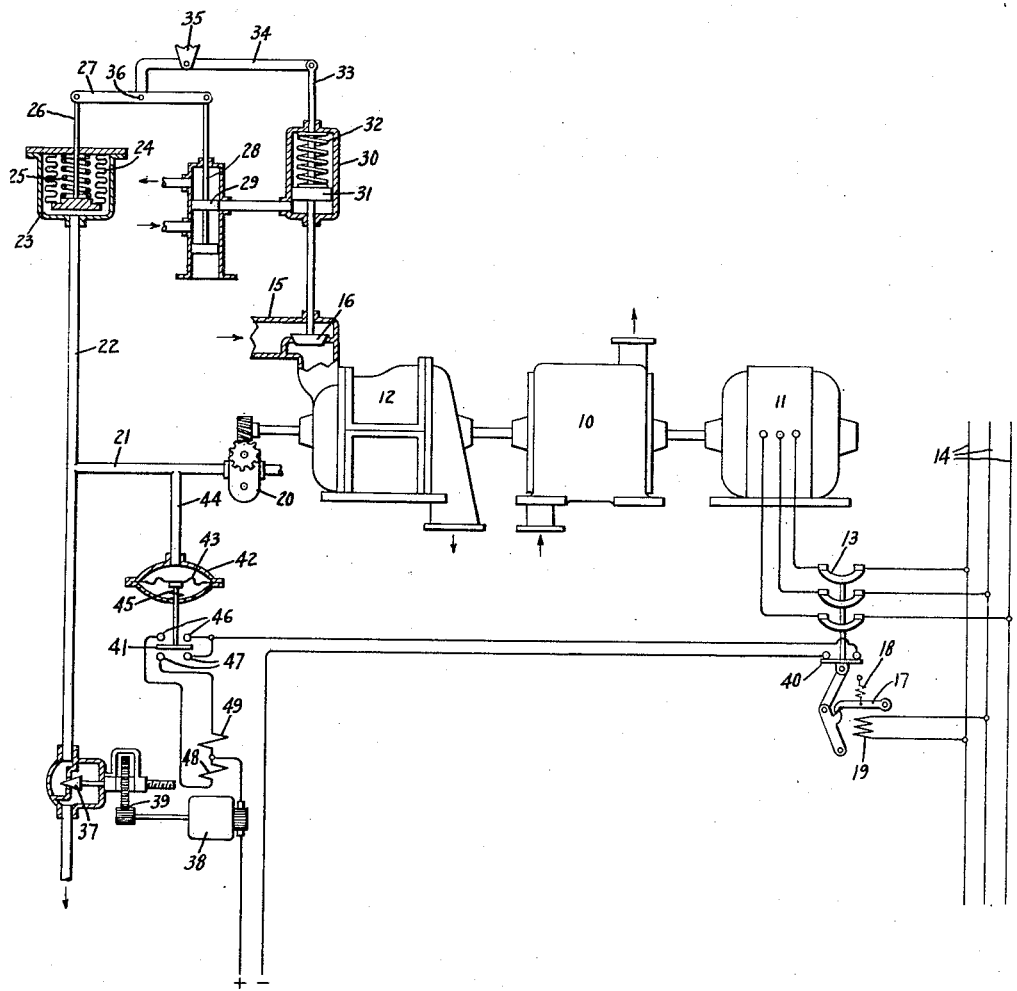
Inventor:
Donald F. Warner,
by Harry E. Dunham
His Attorney.

Patented Nov. 3, 1936

2,059,830

UNITED STATES PATENT OFFICE 2,059,830

VARIABLE SPEED DUAL DRIVE

Donald F. Warner, Lynn, Mass., assignor to General Electric Company, a corporation of New York Application September 5, 1935, Serial No. 39,265

6 Claims. (Cl. 60—6)

The present invention relates to variable speed dual drives, that is, to arrangements including a machine such as a pump normally driven at varying speeds by a main or first prime mover and upon failure of such prime mover driven by another or auxiliary prime mover at a certain speed. In some cases it is desirable to drive the machine by the auxiliary or second prime mover at a speed dependent upon the speed of operation directly prior to the failure of the first prime mover.

The object of the present invention is to provide an improved construction and arrangement of variable speed dual drives of the type above specified whereby the machine is automatically driven by a second prime mover upon the failure of the first prime mover at a definite speed depending upon the speed of operation directly prior to the failure of the main prime mover. This is accomplished in accordance with my invention by the provision of a speed-governing mechanism for the second prime mover and means for setting such governing mechanism in response to speed changes of the first prime mover. If in such arrangement the first prime mover fails, the speed-governing mechanism for the second prime mover is set in accordance with the speed at which the main prime mover operated prior to its failure and the governing mechanism after failure of the first prime mover will maintain substantially constant the speed of the second prime mover.

For a better understanding of what I believe to be novel and my invention, attention is directed to the following description and the claims appended thereto in connection with the accompanying drawing.

The single figure of the drawing shows a diagrammatic view of a variable speed dual drive arrangement in accordance with my invention.

The arrangement comprises a machine, in the present instance shown as a pump 10 for forcing fluid from a point of lower pressure to a point of higher pressure. The pump shaft is coupled with an alternating-current motor 11 and with an elastic fluid turbine 12. The alternating-current motor 11 represents a first or main prime mover for normally driving the pump and the turbine 12 constitutes an auxiliary or second prime mover for driving the pump upon failure of the first prime mover. The first prime mover, that is, the motor 11, is connected through a switch 13 to an alternating-current source of electric energy 14. The turbine 12 has an inlet conduit 15 with a valve or control member 16 for controlling the supply of elastic fluid thereto. During normal conditions the turbine 12 is out of operation, its valve 16 being shut. The switch 13 is normally closed, causing operation of the pump 10 by the motor 11. Under such conditions the speed of the pump and the motor 11 may vary, let us say between 500 and 1500 R. P. M. Failure of operation may occur due to failure of supply from the line 14. In the present instance I have shown a tripping mechanism including a latch 17 biased upward by a spring 18 and biased downward and held in operating position by a holding coil 19. The tripping mechanism effects opening of the switch 13 as the voltage of line 14 drops to a certain value. Any suitable known mechanism may be provided for opening the switch 13 in response to a condition in line 14. As stated before, the speed of the motor 11 is variable between 500 and 1500 R. P. M. Let us assume that the motor fails at a speed of 1000 R. P. M. It then becomes desirable to transfer the load from the motor 11 to the elastic fluid turbine 12 at a definite speed. In the present instance I have shown a governing mechanism for the turbine and means for setting the governing mechanism so that operation will be continued at a speed which is a certain percentage, for instance 10%, lower than the speed prior to failure of the motor 11. If the speed was 1000 R. P. M. prior to failure, operation would be continued after load transfer to the turbine at a speed of about 900 R. P. M.

The governing mechanism for the turbine 12 comprises a positive displacement pump 20 driven from the turbine shaft and connected by conduits 21 and 22 to a pressure-responsive device 23. The latter includes a bellows 24 biased downward by a compression spring 25 and connected by a link 26 to the left-hand end of a floating lever 27. The right-hand end of the floating lever is connected to a pilot valve 28 having a head 29 which normally covers a port connection to a hydraulic motor 30. The hydraulic motor 30 has a piston 31 biased downward by a compression spring 32 and connected by a stem 33 to the right-hand end of a lever 34 which has an intermediate point supported on a fulcrum 35 and a left-hand end connected to an intermediate point of the floating lever 27 by a pivot 36. The conduit 22 includes a needle valve 37 through which oil or like actuating fluid pumped by the pump 20 is discharged. This valve is adjustable and assures maintenance of a definite pressure within the conduit 22 for a certain speed of the turbine 12.

The governing mechanism so far described serves to maintain constant the speed of operation of the turbine 12 while the latter is operating. During operation, an increase in speed of the turbine 12 which may be due to a drop in load of the pump 10 causes an increased speed of the pump 20. This effects an increase in pressure in the conduit 22 and collapsing of the bellows 24. The left-hand end of the lever 27 thereby is moved upward. The lever turning about the pivot 36 then effects downward movement of the pilot valve head 29, permitting the discharge of actuating fluid from the lower end of the hydraulic motor 30 and resulting in downward movement of the piston 31 and closing movement of the turbine inlet valve 16. This reduces the flow of elastic fluid to the turbine and accordingly its speed. Downward movement of the piston 31 also effects clockwise turning movement of the lever 34 about the fulcrum 35. The left-hand end of the lever 34 thereby is moved upward and causes upward movement of the lever 27 about its pivotal connection with the link 26. The pilot valve head 29 thereby is returned to its original position in which it covers the port connection to the cylinder 30. If the turbine speed drops, similar operation takes place except that the different parts are moved in opposite direction to effect opening movement of the turbine inlet valve 16.

It will be readily understood that the speed of operation of the turbine may be varied by setting of the needle valve 37. In accordance with my invention the setting of the needle valve 37 is effected automatically in response to speed variations of the first prime mover or motor 11. The means for accomplishing this include a reversible or pilot motor 38 mechanically connected to the needle valve 37 by a speed-reducing gearing 39. The motor circuit includes a contact-making member 40 secured to the switch 13 of the motor 11 and another contact-making member 41 operated by a pressure-responsive device 42. The latter comprises a casing with an upper and a lower half separated by a diaphragm 43, which latter is mechanically connected to the contact-making member 41. The space defined between the diaphragm and the upper casing half is subjected to the pressure in the conduit 21 by a pipe connection 44. The diaphragm is biased in upward direction, that is, against the pressure in the upper casing half by a compression spring 45. The contact-making member 41 serves to bridge either of two pairs of contacts 46 and 47. One of the contacts, for instance, 47, serves to close a field 48 causing operation of the pilot motor 38 in a certain direction, and the other contacts 47 serve to close a field 49 of the pilot motor 38, causing operation of the latter in the opposite direction.

Let us assume the arrangement shown in the drawing is operating normally, the pump being driven by the motor. If now the speed of the motor 11 increases which may be due to a drop in load demand from pump 10, such increase in speed effects an increased pressure in conduits 21 and 44 due to the increased speed of the pump 20. The increased pressure in turn effects downward movement of the diaphragm 43 and accordingly closing of the contacts 47. This closes the circuit for the motor 38 and causes operation of the latter in a direction to open the valve 37. Vice-versa, a drop in speed of the motor 11 will effect setting of the governing mechanism in a direction to close the needle valve 37. Thus, the governing mechanism for the turbine 12 is continuously set in response to speed variations of the motor 11 and upon failure of the motor 11 the turbine 12 will take over the load at a speed responsive to the speed of the motor 11 prior to the failure. In the preesnt instance the pressure-responsive devices and other elements of the mechanism, in particular the spring 25 of the pressure-responsive device 23, are adjusted to effect operation of the turbine 12 at a speed of about 10% below the speed of the motor 11 prior to the failure thereof.

Whereas I have shown and described my invention in connection with a specific example, it will be understood that the invention is of general application.

What I claim as new and desire to secure by Letters Patent of the United States, is:

1. Variable speed dual drive arrangement including the combination of a machine, a first prime mover for normally driving the machine at a variable speed, and means including a second prime mover for automatically driving the machine upon failure of the first prime mover at substantially constant speed which speed has a fixed relation to the speed at which the first prime mover failed.

2. Variable speed dual drive arrangement including the combination of a machine, a first prime mover for normally driving the machine at a variable speed, and means including a second prime mover for driving the machine upon failure of the first prime mover at a speed dependent upon the speed of the first prime mover prior to its failure, said means including an adjustable governing mechanism for the second prime mover, and means for automatically setting the mechanism in response to speed changes of the first prime mover.

3. Variable speed dual drive arrangement including the combination of a machine, a first prime mover for normally driving the machine at a variable speed, a second prime mover having a control member for driving the machine upon failure of the first prime mover, a speed governing mechanism for the second prime mover comprising a pressure-responsive device connected to the control member, a positive displacement pump driven by the prime movers, a conduit including a bleed-off valve connected to the pump and the pressure-responsive device, means for automatically setting the valve in response to speed changes of the first prime mover, and other means for rendering the last named means inoperative upon failure of the first prime mover.

4. Variable speed dual drive arrangement including the combination of a machine, a first prime mover for driving the machine at variable speed, a second prime mover for driving the machine upon failure of the first prime mover, an adjustable governing mechanism for controlling the flow of actuating medium to the second prime mover, means for varying the setting of the governing mechanism in response to speed changes of the first prime mover, and other means for automatically rendering the last named means inoperative upon failure of the first prime mover.

5. Variable speed dual drive arrangement including the combination of a pump, a motor for normally driving the pump at varying speed, an elastic fluid turbine having an inlet valve for controlling the supply of elastic fluid thereto to drive the pump upon failure of the motor at a speed dependent upon the operating speed prior to the failure, means including a positive displacement pump and a pressure-responsive device connected to the pump for controlling the turbine valve, a bleed-off valve in the discharge conduit of the pump and means for setting the valve in response to speed changes of the motor comprising a pilot motor for actuating the valve, an electric circuit including contact making and breaking means for the pilot motor and a pressure-responsive device subjected to the discharge pressure of the positive displacement pump for actuating the contact-making and breaking means.

6. Variable speed dual drive arrangement including the combination of a pump, a motor for normally driving the pump at varying speed, an elastic fluid turbine having an inlet valve for controlling the supply of elastic fluid thereto to drive the pump upon failure of the motor at a speed dependent upon the operating speed prior to the failure, means including a positive displacement pump having a discharge conduit, a pressure-responsive device connected to the conduit for controlling the turbine valve, a bleed-off valve in the conduit, means for setting the valve in response to speed changes of the motor comprising a pilot motor for actuating the valve, an electric circuit including contact-making and breaking means for the pilot motor and a pressure-responsive device subjected to the discharge pressure of the positive displacement pump for actuating the contact-making and breaking means, another electric circuit including a switch for the motor, and means including a contact-making member operated in response to opening of the switch for interrupting the pilot motor circuit upon failure of the motor.

DONALD F. WARNER.